J. R. Jackson.
Plow.

N° 87,677.    Patented Mar. 9, 1869.

Witnesses:  
Edwin James  
W. B. Frisby

Inventor:  
John R. Jackson  
per J. E. J. Holmead  
Attorney

UNITED STATES PATENT OFFICE.

JOHN R. JACKSON, OF PELAHATCHEE DEPOT, MISSISSIPPI.

IMPROVEMENT IN SULKY-PLOWS.

Specification forming part of Letters Patent No. 87,677, dated March 9, 1869.

*To all whom it may concern:*

Be it known that I, JOHN R. JACKSON, of Pelahatchee Depot, county of Rankin, and State of Mississippi, have invented certain new and useful Improvements in Sulky-Plows; and I do hereby declare that the following is a full, clear, and exact description of the same, reference being had to the accompanying drawings, and the letters of reference marked thereon, making part of this specification, in which—

Figure 1:
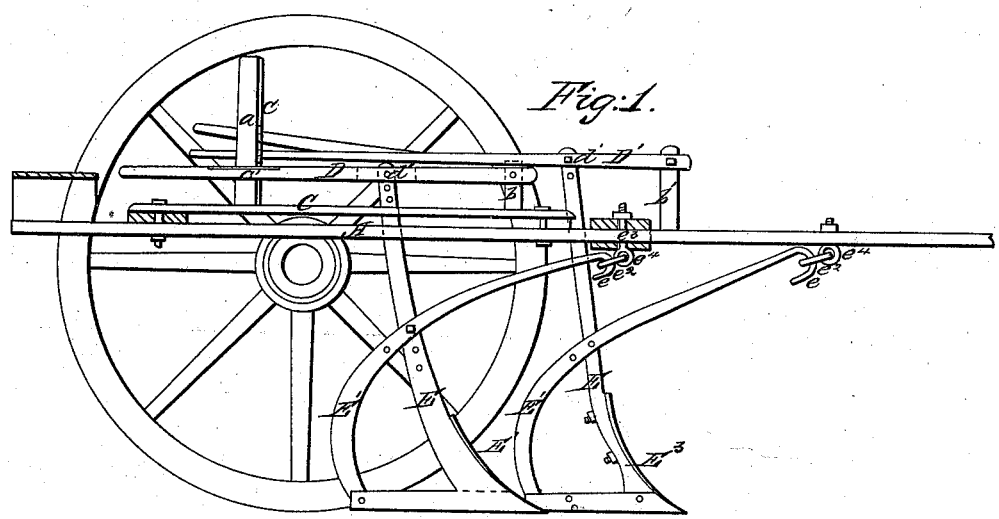
Figure 2:
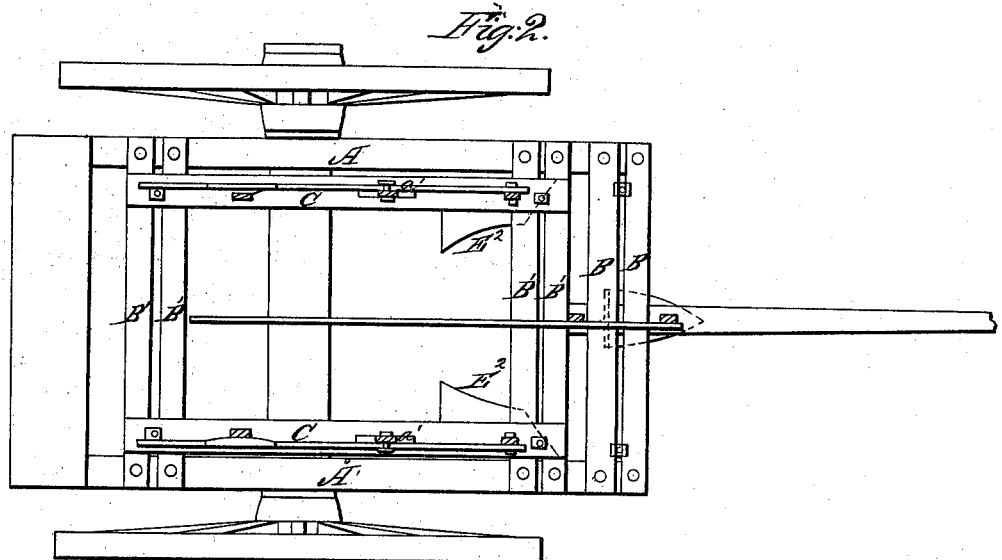

Figure 1 is a side view with one wheel removed. Fig. 2 is a top view.

The nature of my invention consists in so arranging a sulky-plow that it will be the only machine in the nature of a plow that is required to prepare and cultivate a crop of most any of the products grown in the United States, while at the same time it is simple in its workings, strong and durable, easily managed, and efficient and expeditious.

To enable others skilled in the art to make and use my invention, I will now proceed to describe its construction and operation.

A A are the two side beams of the framework of the plow.

B B and B' B' are the cross-beams, which are firmly bolted to the front and rear of the side beams, A A.

C C are the beams, to which are fastened the uprights by means of which the lever-handles are operated and the plows raised or lowered, as required. These beams are so constructed that they can be moved either toward or away from each other, as occasion requires. $a\ a$ are the uprights, which are firmly secured to the beams C C a short distance in rear of the center of the wheels, and are provided on their front side with a toothed plate, $c\ c$, which projects a short distance beyond the side of the upright. $b\ b$ are the uprights, which are firmly secured on the front end of the beams C C, and to which are pivoted the lever-handles D D. These lever-handles D D are each provided with a hole, through which passes a bolt, $d$, which is made with a square head at one end and screw-threads at the other, on which fits a nut. This bolt $d$ passes through a hole in the upper part of the shank of the plow, and fastens the same to the lever. These lever-handles are also each provided with a plate, $c'$, which fits in the toothed plate $c$ and keeps the plow in the position desired.

E and E' are the front and rear shank, to which are attached the plow-shares $E^2$. The shank E' is curved and provided at its upper end with a hook, $e$. This hook $e$ catches in a ring, $e^2$, which passes through the hole in the lower end of the pin $e^3$.

$e^3$ is a pin, which works between the cross-beams B B, and is provided at its lower end with a hole, $e^4$, and at its upper end with screw-threads and nut $e^5$.

$a\ a'$ are slots in the beams C C, through which pass the shanks E E.

The front or center plow $E^3$ is fastened in the same way as the others, with the exception that the shank E' and the upright $b'$ are fastened to the pole, while the shank E passes through a slot in the rear of the pole, between the beams B' and B, and is fastened to the lever D' by means of the bolt $d'$ and a nut. This plow can be detached when not necessary for use.

The operation is as follows: The machine as shown in the drawings is represented as ready to lay off and ridge up with two furrows. After this is done you can detach the center plow. This is done by simply unscrewing the nut on the bolt $d'$ and withdrawing the shank E, while at the same time you unhook the shank E' from the ring $e^2$. The other plows can be detached in a similar manner. After you have detached the center plow, widen the gage between the other two plows, and you are ready to throw two more furrows to the ridges. Continue this operation until the lands are plowed out or ridged up. After the land is ridged up and you desire to work from the ridges, shift the plows from right to left, and vice versa, and you are ready to bar off the ridge. Again, detach the left-hand plow and insert another with right wing set to run parallel with but a short distance in rear of the other, and you are ready to fallow or break up land broadcast, two furrows at the same time. Again, by attaching to my frame-work as at present arranged three shovel plows or sweeps, or any other shaped plow now in use, you have a machine prepared to cultivate corn, cotton, potatoes, or any kind of grain.

Having thus fully described my invention, what I claim therein as new, and desire to secure by Letters Patent of the United States, is—

1. The beams C C, levers D D, tooth-plated uprights *a a*, in combination with the adjustable and reversible plows E² E², when the whole is constructed and arranged substantially as described, as and for the purpose specified.

2. The detachable center plow E³, E, and E', with lever D', and upright *b'*, as constructed, when the same is so arranged as to be used in combination with the two side plows, E² E², substantially as described, as and for the purpose specified.

In testimony whereof I have signed my name to this specification in the presence of two subscribing witnesses.

JOHN R. JACKSON.

Witnesses:
   T. D. HARRIS,
   J. A. PENN.